(12) United States Patent
Santos

(10) Patent No.: US 7,805,205 B2
(45) Date of Patent: Sep. 28, 2010

(54) CONTROL SYSTEM FOR WIND TURBINE

(75) Inventor: Richard Arsenio Santos, Barcelona (ES)

(73) Assignee: Ecotecnia, s. coop.c.l., Barcelona (ES)

( * ) Notice: Subject to any disclaimer, the term of this patent is extended or adjusted under 35 U.S.C. 154(b) by 972 days.

(21) Appl. No.: 11/606,445

(22) Filed: Nov. 30, 2006

(65) Prior Publication Data

US 2008/0086281 A1  Apr. 10, 2008

(51) Int. Cl.
*G06F 19/00* (2006.01)
(52) U.S. Cl. .............................. 700/28; 700/29; 700/30; 700/32; 290/44; 702/127; 702/187; 702/189
(58) Field of Classification Search .................. 290/44; 700/28–30, 32; 702/127, 187, 189
See application file for complete search history.

(56) References Cited

U.S. PATENT DOCUMENTS

| | | | | | |
|---|---|---|---|---|---|
| 4,160,170 | A | * | 7/1979 | Harner et al. ................. | 290/44 |
| 4,189,648 | A | * | 2/1980 | Harner ......................... | 290/44 |
| 4,193,005 | A | * | 3/1980 | Kos et al. ..................... | 290/44 |
| 6,940,186 | B2 | * | 9/2005 | Weitkamp .................... | 290/44 |
| 7,042,109 | B2 | * | 5/2006 | Gabrys ......................... | 290/44 |
| 7,400,057 | B2 | * | 7/2008 | Sureshan ...................... | 290/55 |
| 7,560,823 | B2 | * | 7/2009 | Schellings ................... | 290/44 |
| 2003/0127862 | A1 | | 7/2003 | Weitkamp | |
| 2006/0033338 | A1 | * | 2/2006 | Wilson ......................... | 290/44 |
| 2007/0183885 | A1 | * | 8/2007 | Ormel et al. ................. | 415/4.1 |
| 2008/0001409 | A1 | * | 1/2008 | Schellings ................... | 290/44 |

FOREIGN PATENT DOCUMENTS

DE 19847982 A1 * 6/1999

OTHER PUBLICATIONS

"Receding Horizon Control", Maria M. Seron, Sep. 2004—The University of Newcastle: Centre for Complex Dynamic Systems and Control.*
Thomsen, Kenneth; "The Statistical Variation of Wind Turbine Fatigue Loads"; Risø National Laboratory, Roskilde, Denmark; Sep. 1998.

* cited by examiner

*Primary Examiner*—Michael D Masinick
(74) *Attorney, Agent, or Firm*—Shook Hardy & Bacon

(57) ABSTRACT

A control system for a wind turbine comprises: a sensor arrangement for capturing measures related to the turbine operation and fatigue accumulation; an upper level controller, which, on the basis of a statistical treatment of said measures, calculates optimized control settings at discrete points of time; a measurement module which processes said measures into instantaneous values; and a lower level controller that receives said control settings and said instantaneous values and calculates instantaneous optimal commands to control turbine actuators. The lower level controller comprises a continuous-time damage model which calculates the rate at which damage is accumulated at any time, and an optimal controller which controls operational states of the turbine, either by directly giving feedback of the instantaneous values to the actuators, or by generating a turbine performance objective function which is continuously optimized by repeatedly solving a receding horizon optimization problem.

21 Claims, 1 Drawing Sheet

CONTROL SYSTEM FOR WIND TURBINE

CROSS-REFERENCE TO RELATED APPLICATIONS

This application claims priority to European Patent Application No. EP06122043 filed Oct. 10, 2006.

FIELD OF THE INVENTION

The present invention relates to a control system for a wind turbine that comprises a sensor arrangement for capturing measures related to the turbine activity and an upper level controller which, on the basis of a statistical treatment of said measures, calculates optimized values at discrete points of time for at least one operational state of the turbine. The invention also relates to a wind turbine comprising such a control system.

The invention also relates to a method for controlling a wind turbine that comprises capturing measures related to the turbine activity and adjusting operational states of the wind turbine with turbine actuators.

BACKGROUND OF THE INVENTION

The energy output of a wind turbine depends on the rotor diameter. However, the mechanical stresses of the elements of the turbine structure (such as rotor, nacelle, and tower) increase quadratically with the rotor diameter. This is a serious drawback, especially when the wind speed is high, because larger rotors normally require lowering the switch-off speed, i.e., the wind speed over which the turbine stresses become unacceptable and the rotational speed of the rotor, and hence the turbine output, has to be decreased. Thus, it is important to control the rotor speed in order to limit the turbine structure fatigue.

The conventional current wind turbine design mindset treats the wind turbine structure and the wind turbine controller as separate entities. The controller normally is used to maximize power production below rated wind speed, and in higher wind speeds it maintains constant rotor velocity and power output. The turbine mechanical structure is then designed to support a fixed lifespan subject to the predicted lifetime loads. Unfortunately, during the operational life of a wind turbine, it may be discovered that the mechanical fatigue loads are either higher than predicted or the material fatigue properties are not as durable as anticipated, resulting in a shorter than expected lifetime for the turbine.

US Patent Application Publication No. US 2003/0127862 A1, published Jul. 10, 2003 in the name of Weitkamp, which is hereby incorporated by reference to the same extent as though fully disclosed herein, discloses a control system for a wind power plant that comprises sensors for the detection of measurement values, such as rotor speed, pitch angle, or wind speed, which are used for direct or indirect quantification of the current loading and stress of the turbine occurring in dependence on the local and meteorological conditions. An electronic signal processing system is also provided, operative to the effect that the power reduction required in the optimized condition of the wind power plant will be restricted to obtain optimum long-term economical efficiency under the current operating conditions, both in cases of winds in the range of the nominal wind velocity and in cases of high wind velocities.

In the art, the detected measurement values, or states, are processed into statistical data. See, for example, "The Statistical Variation of Wind Turbine Fatigue Loads" by Kenneth Thomsen, Risø National Laboratory, Roskilde, Denmark, September 1998, which is incorporated herein by reference to the same extent as though fully disclosed herein. The statistical operating data are converted into statistical stress data from which a stress distribution is derived. The control process is performed when the local or meteorological conditions undergo a relatively large change, or after a turbine cycle (hysteresis loop) is completed. At these times, which typically are on the order minutes or hours or even days, optimized values of the operational parameters or states of the turbine are set according to the optimized statistical data. In this way, statistically averaged aspects of the turbine structure are considered in the control of the turbine. However, there remains a risk that mounting damage may go undetected until it has severely curtailed the lifespan of the wind turbine, or, on the other hand, the wind turbine may be running for significant periods at below the optimum power level, either of which adversely affects the economics of the turbine. Thus, a wind turbine control system that provides for optimizing the economics of the turbine both with respect to power output and turbine structure would be highly desirable.

BRIEF SUMMARY OF THE INVENTION

It is an object of the present invention to adjust the wind turbine control so as to maximize its energy output while maintaining the design life of the turbine or even extending it.

The values measured by the turbine sensors are normally called states. This set of states represents the current "state" of the turbine. There are wind states and also states that may be controlled, such as:

Turbine operational states: these are the parameters the turbine actuators actuate on, such as generator speed, pitch angle, electrical power, accelerations, etc.

Load states: these are the internal mechanical loads in the turbine structure.

Stress states: these are the stresses in the turbine at any point on the structure.

Damage states: these are the damage rate and the accumulated damage at the points where the stress states exist.

According to an aspect of the invention, the control system for a wind turbine comprises a measurement module which processes the measurements captured by the sensor arrangement into instantaneous values, and a lower level controller which receives said instantaneous values and the optimized values calculated by the upper level controller and calculates optimized values at anytime for at least one state of the turbine.

Thus, the inventive control system includes a two level control design: an upper level controller followed by a lower level controller, wherein the upper level controller performs a slow optimization based on statistical analysis of the operational states and fatigue damage states of the turbine and generates discrete control system settings, and the lower level controller performs a fast optimization based on instantaneous sensor values and control system settings and generates control inputs for the turbine actuators. The lower level controller is constantly running to reduce fatigue under all conditions.

Advantageously, the lower level controller comprises a continuous-time damage computing module which calculates the rate at which damage in selected parts of the turbine structure is accumulated at any time, which may be referred to as the damage rate state. The continuous-time damage computing module allows determining the actual damage the turbine is suffering at any instant of time.

Preferably, the lower level controller comprises a wind turbine structural computing module which calculates a distribution of stresses in the wind turbine structure at any time, known as the stress state of the turbine. This stress distribution is input to the continuous-time damage computing module for being processed into instantaneous damage rate states.

In an embodiment, the lower level controller comprises an internal load computing module which calculates a distribution of internal mechanical loads in the wind turbine structure, known as the load states of the turbine. This load distribution is input to the wind turbine structural computing module for being processed into instantaneous stress states.

In an embodiment, the lower level controller comprises an aeroelastic wind turbine computing module which determines the operational states (i.e., the behavior) of the wind turbine subject to wind inflow and control inputs. The turbine operational states are input to the internal load computing module for being processed into instantaneous load states.

In an embodiment, the lower level controller comprises a wind disturbance computing module which determines wind inflow upwind of the turbine, determines current wind disturbances, and calculates future predicted wind inflows and wind disturbances. The wind inflow disturbances are input to the aeroelastic wind turbine computing module for being processed into instantaneous operational states of the turbine.

Preferably, at least one of said lower lever controller computing modules receives instantaneous values from the measurement module. In this way, the wind disturbance computing module may be input with instantaneous wind measurements, the aeroelastic wind turbine computing module may be input with instantaneous operational measurements, or the wind turbine structural computing module may be input with instantaneous load measurements.

Advantageously, the lower level controller comprises an optimal controller which receives states from at least one of the lower lever controller computing modules. Said optimal controller directly controls the wind turbine actuators, in order to optimally follow the desired reference trajectory.

In an embodiment, the optimal controller controls at least one of the operational, load, stress or damage states of the turbine by directly giving feedback of the instantaneous values to the turbine actuators. With this type of controller, the optimal control system gains are calculated offline, and the sensor signals are used for direct linear or non-linear feedback.

In an embodiment, the optimal controller controls at least one of the operational, load, stress or damage states of the turbine by generating a wind turbine performance objective function which is continuously optimized by repeatedly solving a receding horizon optimization problem. With this type of controller, the wind turbine aeroelastic, structural, and damage dynamics are used as an internal model within the control system. The sensors update the internal model to account for internal model errors.

Advantageously, the upper level controller calculates control settings that are sent to the lower level controller, which calculates an optimum control input sequence to be sent to the turbine actuators. The control settings are, for instance, weighting matrices, reference trajectory, and system constraints, and the optimal control inputs are calculated at anytime for each of the turbine actuators.

There may be three or more weighting matrices, such as:
State weight matrix: this matrix provides the relative importance of each of the system states to the overall objective function.
Control weight matrix: this matrix provides the relative importance of the control inputs to the overall objective function.
Damage rate matrix: this matrix provides the relative importance of the damage rate of various critical structural points to the overall objective function.

The system constraints limit the turbine states to realizable levels. Examples may be: limiting pitch angle between 0 and 90 degrees, limiting the generator speed to remain under a maximum level (1900 rpm for example). They may also include limiting the damage rate below a specified value.

The reference trajectory defines the desired closed-loop behavior of the wind turbine states ("closed-loop behavior" means that the turbine states depend not just on time but also on the control inputs). When these trajectories are considered constant over time, they may be referred to as "set points". For example, when the winds are high, the reference trajectory is to maintain the generator at 1800 rpm (a set point) and the low speed shaft torque constant (another set point). Another example is that the nacelle acceleration should always be zero (yet another set point).

According to another aspect of the invention, the wind turbine comprises a control system with the above features disclosed in this section.

According to another aspect of the invention, the method for controlling a wind turbine comprises the steps of processing the sensor measures into instantaneous values, and calculating optimized values at anytime for at least one state of the turbine on the basis of said instantaneous values.

In an embodiment, the method for controlling a wind turbine comprises the step of calculating the rate at which damage in selected parts of the turbine structure is accumulated at anytime.

In an embodiment, the method for controlling a wind turbine comprises the step of calculating a distribution of stresses in the wind turbine structure at anytime.

In an embodiment, the method for controlling a wind turbine comprises the step of calculating a distribution of internal mechanical loads in the wind turbine structure.

In an embodiment, the method for controlling a wind turbine comprises the step of determining the operational states of the wind turbine subject to wind inflow and control inputs.

In an embodiment, the method for controlling a wind turbine comprises the steps of determining wind inflow upwind of the turbine, determining current wind disturbances, and calculating future predicted wind inflows and wind disturbances.

In an embodiment, the method for controlling a wind turbine comprises the step of controlling at least one of the operational, load, stress, or damage states of the turbine by directly giving feedback of the instantaneous states to the turbine actuators.

In an embodiment, the method for controlling a wind turbine comprises the step of controlling at least one of the operational, load, stress, or damage states of the turbine by generating a wind turbine performance objective function which is continuously optimized by repeatedly solving a receding horizon optimization problem.

In an embodiment, the method for controlling a wind turbine comprises the step of calculating control settings that are used to calculate an optimum control input sequence to be sent to the turbine actuators. As stated before, the control settings are calculated by the upper level controller and the optimum control input sequence is calculated by the lower level controller.

The invention provides a control system for a wind turbine that comprises a sensor arrangement for capturing measures related to the turbine activity, and an upper level controller which, on the basis of a statistical treatment of the measures, calculates optimized values at discrete points of time for at least one operational state of the turbine, characterized in that the control system also comprises a measurement module which processes the measures into instantaneous values, and a lower level controller which receives the instantaneous values and the optimized values calculated by upper level controller and calculates optimized values at any time for at least one state of the turbine. Preferably, the lower level controller comprises a continuous-time damage computing module which calculates the rate at which damage in selected parts of the turbine structure is accumulated at any time. Preferably, the lower level controller comprises a wind turbine structural computing module which calculates a distribution of stresses in the wind turbine structure at any time. Preferably, the lower level controller comprises an internal load computing module which calculates a distribution of internal mechanical loads in the wind turbine structure. Preferably, the lower level controller comprises an aeroelastic wind turbine computing module which determines the operational states of wind turbine subject to wind inflow and operational actions. Preferably, the lower level controller comprises a wind disturbance computing module which determines wind inflow upwind of turbine, determines current wind disturbances, and calculates future predicted wind inflows and wind disturbances. Preferably, the lower level controller includes a plurality of computing modules selected from the group consisting of: a continuous-time damage computing module; a wind turbine structural computing module; an internal load computing module; an aeroelastic wind turbine computing module; and a wind disturbance computing module; and at least one of the lower lever controller computing modules receives instantaneous values from the measurement module. Preferably, the lower level controller comprises an optimal controller which receives results from at least one of the lower lever controller computing modules. Preferably, the optimal controller controls at least one of the operational, load, stress, or damage states of turbine by directly giving feedback of the instantaneous values to turbine actuators. Preferably, the optimal controller controls at least one of the operational, load, stress, or damage states of turbine by generating a wind turbine performance objective function which is continuously optimized by repeatedly solving a receding horizon optimization problem. Preferably, the upper level controller calculates control settings that are sent to the lower level controller, which calculates an optimum control input sequence to be sent to turbine actuators.

The invention also provides a wind turbine comprising a control system that comprises a sensor arrangement for capturing measures related to the turbine activity, and an upper level controller which, on the basis of a statistical treatment of the measures, calculates optimized values at discrete points of time for at least one operational state of the turbine, characterized in that the control system also comprises a measurement module which processes the measures into instantaneous values, and a lower level controller which receives the instantaneous values and the optimized values calculated by upper level controller and calculates optimized values at any time for at least one state of the turbine.

The invention also provides a method for controlling a wind turbine, the method comprising: capturing measures related to the activity of the turbine; processing the measures into instantaneous values; and calculating optimized values at any time for at least one state of the turbine on the basis of the instantaneous values. Preferably, the calculating comprises calculating the rate at which damage in selected parts of the turbine structure is accumulated. Preferably, the calculating comprises calculating a distribution of stresses in the wind turbine structure. Preferably, the calculating comprises calculating a distribution of internal mechanical loads in the wind turbine structure. Preferably, the calculating comprises determining the operational states of the wind turbine subject to wind inflow and control inputs. Preferably, the capturing comprises: determining wind inflow upwind of the turbine, and determining current wind disturbances; and the calculating comprises calculating future predicted wind inflows and wind disturbances. Preferably, the method further comprises controlling at least one of the operational load, stress, or damage states of the turbine by directly giving feedback of the instantaneous values to the turbine actuators. Preferably, the calculating comprises controlling at least one of the operational, load, stress, or damage states of the turbine by generating a wind turbine performance objective function which is continuously optimized by repeatedly solving a receding horizon optimization problem. Preferably, the calculating comprises calculating control settings that are used to calculate an optimum control input sequence to be sent to turbine actuators.

In another aspect, the invention provides a control system for a wind turbine that comprises a sensor arrangement for capturing measures related to the turbine activity, a measurement module which processes the measures into instantaneous values, and a lower level controller which receives the instantaneous values and calculates instantaneous optimized values for at least one structural state of the turbine. Preferably, the at least one structural state comprises a state selected from the group consisting of: the rate at which damage in a selected part of the wind turbine structure is accumulated; a distribution of stresses in the wind turbine structure; or a distribution of internal mechanical loads in the wind turbine structure.

The system according to the invention permits including long-term economic factors to be used in controlling the wind turbine in real-time, eliminates the risk that mounting damage may go undetected until it has severely curtailed the lifespan of the wind turbine, and permits the power output of the turbine to be optimized in a continuous fashion. Numerous other features, objects, and advantages of the invention will become apparent from the following description when read in conjunction with the accompanying drawings.

BRIEF DESCRIPTION OF THE DRAWINGS

Some particular embodiments of the present invention will be described in the following, only by way of non-limiting example, with reference to the appended drawings, in which.

DETAILED DESCRIPTION OF THE INVENTION

Figure 1:
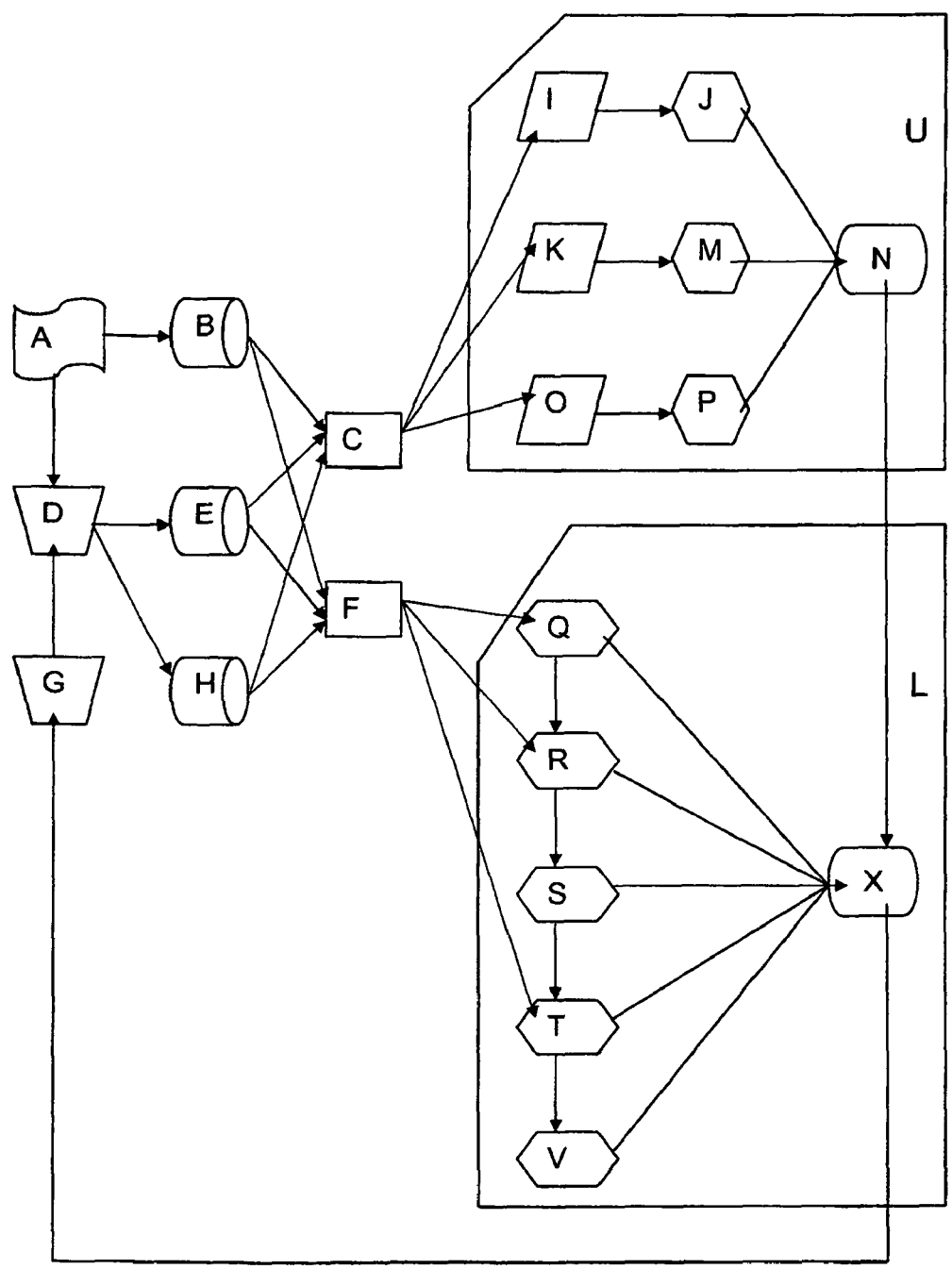
FIG. 1 is a block diagram showing an embodiment of a control system for wind turbines.

To the left of the block diagram of the sole FIGURE is shown a schematic representation of the wind inflow and wind disturbance A, a wind turbine structure D and its wind sensors B, turbine operational sensors E, and load or damage sensors H. The operational values of turbine D are adjusted by wind turbine actuators G, which may be, among others, the full span blade pitch, the nacelle yaw actuator, and the electrical generator. Future aerodynamic control actuators may be employed to improve control performance.

The wind inflow sensors may include mechanical, laser, or acoustic devices. Turbine operational sensors E may include rotor speed, pitch angle, generator electric torque, generator electric power, acceleration of the tower head, or various temperatures and safety sensors. Damage sensors H may include electrical strain gauges, fiber optic strain gauges, load cells, or conditioning monitoring equipment intended to indirectly or directly measure damage on critical structural components of the wind turbine.

On the upper right-hand side of the drawing is an upper level controller U. The upper level controller U comprises a wind inflow database O, a turbine performance database I, a structural fatigue database K, a wind inflow statistical model P, a turbine performance statistical model J, a structural fatigue model M, and a forecaster/optimizer N. The functions of each are described below.

Between the sensor arrangement and the upper level controller is a statistical processor C that processes the measures captured by the sensors into statistical data, which are input to the upper level controller U.

Wind inflow database O records the statistical data measured by the various wind inflow sensors B. Stored variables will vary by the type of sensors used but may include states of hub height statistics, turbulence intensity, vertical and horizontal wind shear, and atmospheric stability.

Turbine performance database I stores the operational states of the turbine as functions of the wind inflow conditions and the applied turbine control settings. Stored variables may include electrical power, generator speed, pitch position, pitch actuator, duty cycle, gearbox temperature, nacelle acceleration levels, etc.

Structural fatigue database K stores the damage rate state and accumulated damage state statistics for each critical structural component as a function of the wind inflow conditions and the applied turbine control settings.

Wind inflow statistical model P is used to generate statistical distributions of each of the measured wind inflow states.

Turbine performance statistical model J processes operational states as multi-variable regressions of the stored database variables mentioned above. The regression variables are wind inflow statistics and control system states.

Structural fatigue model M processes damage rate states and accumulated damage states as multi-variable regressions of the stored database variables mentioned above. The regression variables are wind inflow statistics and turbine control system settings.

Upper level forecaster/optimizer N uses wind inflow statistical model P, turbine performance statistical model L, and structural fatigue model M to generate an objective function that represents the revenue that the turbine would see in the rest of its fatigue life as a function of the control system variables. It then uses a numerical optimizer that determines the best control settings to produce the most revenue within its remaining fatigue life. As mentioned previously, the control settings may include weighting matrices, reference trajectory and system constraints.

The lower right-hand block in the diagram represents a lower level controller L that directly controls the wind turbine actuators. The lower level controller L comprises a wind disturbance model Q, an aeroelastic turbine model R, an internal load model S, a turbine structural model T, a continuous-time damage model V, and an optimal controller X The functions of each are described below.

Between the sensor arrangement and the lower level controller is an instantaneous measurement processor F that processes the measures captured by the sensors into instantaneous values or states, which are input to lower level controller L. The term "instantaneous" is to be understood as "at anytime", in contrast with "at discrete points of time".

Wind disturbance model Q uses the instantaneous wind inflow measures from measurement processor F to represent current system disturbances or future predicted disturbances which the controller may minimize or reject.

Aeroelastic turbine model R represents the behavior of the wind turbine (i.e., its operational states) subject to the wind inflow disturbances and the controlled actuator inputs. The model may be used offline to generate optimal feedback gains in the case of an optimal offline controller, or may be included as part of an objective function when using an online optimized control strategy. Aeroelastic turbine model R may be a simple linearized model of the turbine operational states or a fully nonlinear elastic simulation.

Internal load model S accepts the operational states of aeroelastic turbine model R and calculates the internal mechanical load states on main load paths of the wind turbine structure.

Wind turbine structural model T receives the internal mechanical load states from internal load model S and generates a stress spatial distribution states for the turbine structure using mathematical models representing the wind turbine structure. Wind turbine structural model T may use simple factors applied to the processed mechanical loads or complete multi-axial results determined from finite element models.

Continuous-time damage model V accepts the above calculated stress states and material fatigue properties and determines the rate at which damage is accumulated in each critical point, the damage rate states, of the wind turbine structure. The resulting signal may be used for direct feedback in the case of an offline optimal controller, or may be used as part of an objective function when used in an online optimal controller.

Online/offline optimal controller X uses the above-mentioned lower level controller models to directly control wind turbine actuators G. It also uses the control settings of the limited optimization performed by optimizer N of upper level controller U.

Optimal controller X may operate according to two different control procedures:

Offline Optimal Control: in this control procedure, the optimal control system gains are calculated offline, and the sensor signals are used for direct linear or non-linear feedback.

Online Optimal Control: in this control procedure, the wind turbine aeroelastic, structural, and damage dynamics are used as an internal model within the control system. The model becomes part of an objective function, which is continuously minimized by an optimization routine within a receding predictive/control horizon. The wind turbine sensors update the internal model to account for internal model errors.

One way of implementing the offline optimal control system is by solving the State-Dependent Ricatti Equations (SDRE), where the gains of the system are calculated in real time as a function of the instantaneous damage rate states and the accumulated damage states. This procedure may include a non-linear feedback control.

One way of implementing the online optimal control system is by means of a Model Predictive Control (MPC), both linear and non-linear. This procedure uses the wind disturbance prediction to anticipate the wind inflow over the short-term prediction horizon.

In general, in MPC an open-loop sequence of finite-horizon optimal control commands is firstly determined (an open-loop optimal sequence is the result of an offline optimization). Then, the first command, corresponding to the current time, is applied by the controller. At the next control update, rather than applying the second command in the open-loop optimal sequence, the finite horizon optimization is completely redone using a new estimate of the relevant states (by measurement or calculation). In this way, the open-loop finite-horizon optimal control problem becomes a closed-loop problem (i.e., an online optimization). The optimization horizon is said to "recede" because the controller never applies the commands corresponding to the end of the horizon.

In other words, an open-loop optimal sequence is a sequence of optimal control inputs over the control horizon calculated at the beginning of each controller time step, and a closed-loop optimal sequence is a sequence of optimal feedback functions that have to be repeatedly computed over the control horizon. Anyway, the control system provides an optimum control input sequence to be sent to the wind turbine actuators.

In the invention an internal optimization is preferably run at least once every millisecond inside the lower level controller, in order to choose the optimal control strategy. The lower level controller runs constantly to reduce the wind turbine fatigue under all conditions. This means that it is run at least once every five seconds, and more preferably at least once a second. In the most preferred embodiments, it is run every millisecond, and more preferably, it is run from at least three times each millisecond, and most preferably, five or more times per millisecond.

The data from the sensors are passed directly at high rate to lower level controller L to be used in direct or indirect feedback, and/or is processed into statistical data to be sent at a slower rate to upper level controller U to be stored and used for forecasting.

As explained, the control settings are passed from the upper level controller to the lower level controller and comprise weighting variables, system constraints, and reference trajectories that tell the lower level controller how to form the objective function and under what constraints the lower level controller must operate.

The fast control of lower level controller L may be executed on the order of tens of milliseconds to hundreds of milliseconds, while the slow control of upper level controller U is executed on the order of tens of seconds to minutes. For convenience, the fast optimization performed by lower level controller L may be termed "continuous" (which then would mean on the order of tens to hundreds of milliseconds, for instance, from 10 to 900 milliseconds), and the slow optimization performed by upper level controller U may be termed "discrete" (which then would mean on the order of tens of seconds to minutes, for instance, from 20 seconds to 10 minutes).

Summing up the main features of the invention, a control system for a wind turbine comprises: a sensor arrangement (B, E, H) for capturing measures related to the turbine operation and fatigue accumulation; an upper level controller (U), which, on the basis of a statistical treatment of said measures, calculates optimized control settings at discrete points of time; a measurement module (F) which processes said measures into instantaneous values, and a lower level controller (L) that receives said control settings and said instantaneous values and calculates instantaneous optimal commands to control turbine actuators (G). The lower level controller comprises a continuous-time damage model (V) which calculates the rate at which damage is accumulated at anytime, and an optimal controller (X) which controls operational states of the turbine, either offline or online.

There has been described a wind turbine control system that incorporates turbine structure economics into the continuous control of the turbine. It should be understood that the particular embodiments shown in the drawing and described within this specification are for purposes of example and should not be construed to limit the invention, which will be described in the claims below. Further, it is evident that those skilled in the art may now make numerous uses and modifications of the specific embodiments described, without departing from the inventive concepts. Equivalent structures and processes may be substituted for the various structures and processes described; the subprocesses of the inventive method may, in some instances, be performed in a different order, or a variety of different materials and elements may be used. Consequently, the invention is to be construed as embracing each and every novel feature and novel combination of features present in and/or possessed by the wind turbine and control methods described.

What is claimed as new and desired to be protected by Letters Patent of the United States is:

1. A control system for a wind turbine comprising:
    a sensor arrangement capable of capturing measures related to a turbine activity;
    a statistical processor capable of processing data received from the sensor arrangement;
    an instantaneous measurement processor capable of processing data received from the sensor arrangement into instantaneous values;
    an upper level controller which, on the basis of a statistical treatment of the measures from the statistical processor, calculates optimized values at discrete points of time for at least one operational state of the turbine; and
    a lower level controller which receives the instantaneous values based on the measures and the optimized values calculated by upper level controller and calculates optimized commands to control the turbine.

2. A control system for a wind turbine according to claim 1 wherein said lower level controller comprises a continuous-time damage computing module which calculates the rate at which damage in selected parts of the turbine structure is accumulated at any time.

3. A control system for a wind turbine according to claim 1 wherein said lower level controller comprises a wind turbine structural computing module which calculates a distribution of stresses in the wind turbine structure at any time.

4. A control system for a wind turbine according to claim 1 wherein said lower level controller comprises an internal load computing module which calculates a distribution of internal mechanical loads in the wind turbine structure.

5. A control system for a wind turbine according to claim 1 wherein said lower level controller comprises an aeroelastic wind turbine computing module which determines the operational states of wind turbine subject to wind inflow and operational actions.

6. A control system for a wind turbine according to claim 1 wherein said lower level controller comprises a wind disturbance computing module which determines wind inflow upwind of turbine, determines current wind disturbances, and calculates future predicted wind inflows and wind disturbances.

7. A control system for a wind turbine according to claim 1 wherein said lower level controller includes a plurality of computing modules selected from the group consisting of: a continuous-time damage computing module; a wind turbine structural computing module; an internal load computing module; an aeroelastic wind turbine computing module; and a wind disturbance computing module; and at least one of said lower lever controller computing modules receives instantaneous values from said measurement module.

8. A control system for a wind turbine according to claim 7 wherein said lower level controller comprises an optimal controller which receives results from at least one of said lower lever controller computing modules.

9. A control system for a wind turbine according to claim 8 wherein said optimal controller controls at least one of the operational, load, stress, or damage states of turbine by directly giving feedback of the instantaneous values to turbine actuators.

10. A control system for a wind turbine according to claim 8 wherein said optimal controller controls at least one of the operational, load, stress, or damage states of turbine by generating a wind turbine performance objective function which is continuously optimized by repeatedly solving a receding horizon optimization problem.

11. A control system for a wind turbine according to claim 8 wherein said upper level controller calculates control settings that are sent to said lower level controller, which calculates an optimum control input sequence to be sent to turbine actuators.

12. A wind turbine comprising a control system as claimed in claim 1.

13. A method for controlling a wind turbine comprising:
capturing measures related to the activity of the wind turbine;
processing the measures in parallel through a statistical processor and an instantaneous processor;
calculating optimized control settings in an upper level controller for at least one state of the turbine on the basis of data from the statistical processor; and
calculating instantaneous optimal commands to control turbine actuators in a lower level controller on the basis of the optimized control settings and data from the instantaneous measurement processor.

14. The method for controlling a wind turbine according to claim 13, wherein the calculating instantaneous optimal commands comprises calculating the rate at which damage in selected parts of the turbine structure is accumulated.

15. The method for controlling a wind turbine according to claim 13, wherein the calculating instantaneous optimal commands comprises calculating a distribution of stresses in the wind turbine structure.

16. The method for controlling a wind turbine according to claim 13, wherein the calculating instantaneous optimal commands comprises calculating a distribution of internal mechanical loads in the wind turbine structure.

17. The method for controlling a wind turbine according to claim 13, wherein the calculating instantaneous optimal commands comprises determining the operational states of the wind turbine subject to wind inflow and control inputs.

18. The method for controlling a wind turbine according to claim 13, wherein the capturing comprises: determining wind inflow upwind of the turbine, and determining current wind disturbances and the calculating instantaneous optimal commands comprises calculating future predicted wind inflows and wind disturbances.

19. The method for controlling a wind turbine according to claim 13, wherein the data from the statistical processor and instantaneous measurement processor are sent at to the lower level controller at a higher rate than the data is sent to the upper level controller.

20. A method for controlling a wind turbine according to claim 13, wherein said calculating comprises controlling at least one of the operational, load, stress, or damage states of the turbine by generating a wind turbine performance objective function which is continuously optimized by repeatedly solving a receding horizon optimization problem.

21. A method for controlling a wind turbine according to claim 13, wherein said calculating comprises calculating control settings that are used to calculate an optimum control input sequence to be sent to turbine actuators.

* * * * *